United States Patent
Cho et al.

(10) Patent No.: US 8,722,282 B2
(45) Date of Patent: May 13, 2014

(54) POWER UNIT AND CARTRIDGE, AND FUEL CELL SYSTEM COMPRISING POWER UNIT AND CARTRIDGE

(75) Inventors: Hye-jung Cho, Yongin-si (KR);
Young-soo Joung, Yongin-si (KR);
Hyuk Chang, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1323 days.

(21) Appl. No.: 12/169,170

(22) Filed: Jul. 8, 2008

(65) Prior Publication Data

US 2009/0023044 A1 Jan. 22, 2009

(30) Foreign Application Priority Data

Jul. 16, 2007 (KR) .................. 10-2007-0071371

(51) Int. Cl.
*H01M 8/04* (2006.01)
*G05D 16/06* (2006.01)

(52) U.S. Cl.
USPC ............................ 429/513; 429/515; 137/613

(58) Field of Classification Search
USPC .............. 429/507–515, 400; 137/613–614.21
See application file for complete search history.

(56) References Cited

U.S. PATENT DOCUMENTS

| | | | | |
|---|---|---|---|---|
| 5,971,019 A | * | 10/1999 | Imai | 137/614.04 |
| 2005/0022883 A1 | * | 2/2005 | Adams et al. | 137/614.03 |

FOREIGN PATENT DOCUMENTS

| | | |
|---|---|---|
| EP | 1 775 791 | 4/2007 |
| EP | 2-023-429 A1 | 2/2009 |
| EP | 2-079-123 A1 | 7/2009 |
| JP | 2006-108013 | 4/2006 |
| KR | 10-2007-0032813 A | 3/2007 |
| WO | WO 2006-050261 | 5/2006 |
| WO | WO-2006-132017 A | 12/2006 |
| WO | WO 2007/133446 | 11/2007 |

OTHER PUBLICATIONS

Extended European Search Report issued by the European Patent Office on Feb. 4, 2009.
Japanese Office Action dated Feb. 20, 2013. (with English Translation)
Japanese Office Action dated Feb. 20, 2013. (with English Translation)

* cited by examiner

*Primary Examiner* — Jonathan G Leong
(74) *Attorney, Agent, or Firm* — Lee & Morse, P.C.

(57) ABSTRACT

A power unit, a fuel cartridge, and a fuel cell system having the power unit and the fuel cartridge. The power unit includes a coupling unit to couple with the fuel cartridge. The coupling unit includes a nozzle that receives fuel supplied from the fuel cartridge, a selection key to selectively mate with the fuel cartridge, and an outer unit surrounding the nozzle. An end of the nozzle is located between the selection key and an end of the outer unit.

37 Claims, 18 Drawing Sheets

POWER UNIT AND CARTRIDGE, AND FUEL CELL SYSTEM COMPRISING POWER UNIT AND CARTRIDGE

CROSS-REFERENCE TO RELATED APPLICATION

This application claims the benefit of Korean Patent Application No. 2007-71371, filed Jul. 16, 2007, in the Korean Intellectual Property Office, the disclosure of which is incorporated herein by reference.

BACKGROUND OF THE INVENTION

1. Field of the Invention

Aspects of the present invention relate to a power unit and a cartridge, and a fuel cell system comprising the power unit and cartridge.

2. Description of the Related Art

A fuel cell system includes a power unit and a cartridge. The cartridge stores fuel used to generate power. The power unit is coupled to the cartridge, to generate power by receiving the fuel. The power unit and the cartridge have a coupling structure, whereby the power unit and the cartridge can be readily attached to, and detached from, the fuel cell system. Also, the coupling structure generally must prevent leakage of fuel during the coupling/decoupling of the power unit and the cartridge, have good coupling safety, and prevent the coupling of an uncertified cartridge. In other words, the coupling structure should provide operation stability.

Once the operational safety is secured, a cartridge that does not have a particular fuel concentration, or a fuel storage system specified by a corresponding power unit, can be prevented from coupling therewith. Thus, performance degradation of the power unit, and a reduction in the reliability of the fuel cell, due to an inflow of fuel having an inappropriate concentration, or an abnormal fuel velocity, can be prevented.

If the coupling safety is high, the coupling of the power unit with the cartridge can be stably maintained, without the occurrence of decoupling, even if an impact is applied to the fuel cell system.

SUMMARY OF THE INVENTION

In order to address the above and/or other problems, aspects of the present invention provide a power unit and a cartridge of a fuel cell system, which secure against fuel leakage, ensure operational safety, and ensure coupling safety.

Aspects of the present invention also provide a fuel cell system comprising the power unit and the cartridge.

According to an aspect of the present invention, there is provided a power unit having a first coupling unit to couple with a cartridge. The first coupling unit comprises: a nozzle that receives fuel supplied from the cartridge; a selection key to select the cartridge; and an outer unit surrounding the nozzle. The selection key is disposed on the outer surface of the outer unit, to selectively mate with the fuel cartridge. The position of the nozzle is lower than an end of the outer unit and higher than the selection key.

According to aspects of the present invention, the selection key may be provided at a position, so as to mate with the fuel cartridge, when the power unit is coupled with the fuel cartridge.

According to aspects of the present invention, the selection key may be formed on an outer surface of the outer unit of the first coupling unit.

According to aspects of the present invention, the selection key may comprise: a first fixing key, a second fixing key having a position that is fixed with respect to the first fixing key, and an auxiliary key positioned between the first and second fixing keys.

According to aspects of the present invention, the power unit may further comprise a coupler to maintain the coupling of the fuel cartridge and the power unit, disposed on the outer surface of the male portion.

According to aspects of the present invention, the nozzle may form a flow channel together with a first poppet that moves into the power unit when the fuel cartridge and the power unit are coupled.

According to aspects of the present invention, the power unit may further comprise an elastic member that applies a force to the first poppet, in a direction towards the nozzle.

According to aspects of the present invention, the power unit may further comprise an O-ring to seal a connection between the first coupling unit and the power unit.

According to an aspect of the present invention, there is provided a fuel cartridge having a second coupling unit to couple with a power unit. The second coupling unit comprises: a fuel supply path that supplies fuel to a nozzle of the power unit; and a female portion, into which a male portion of the power unit is inserted. The female portion comprises a groove to accommodate a selection key of the power unit.

According to aspects of the present invention, the fuel cartridge may further comprise a seal to seal a connection between the first coupling unit and the second coupling unit, prior to contacting the nozzle of the power unit side-coupling unit with the fuel supply path.

According to aspects of the present invention, the seal may be an O-ring accommodated in the inner wall of the fuel cartridge side-coupling unit.

According to aspects of the present invention, the fuel cartridge may further comprise a second poppet that opens the fuel supply path, when the coupling between the fuel cartridge and the power unit is completed.

According to aspects of the present invention, the fuel cartridge may further comprise an elastic member that applies a force to the second poppet, in a direction towards the first coupling unit.

According to another aspect of the present invention, there is provided a fuel cell system having a power unit and a fuel cartridge that is coupled with the power unit. The power unit and the fuel cartridge respectively comprise a first coupling unit and a second coupling unit. The first coupling unit comprises: a nozzle that receives fuel supplied from the fuel cartridge; a selection key to select the fuel cartridge; and a male portion that surrounds the nozzle. An end of the nozzle is located between the selection key and an end of the male portion. The second coupling unit comprises: a fuel supply path that supplies the fuel to the nozzle; and a female portion into which the male portion is inserted. The female portion comprises a groove to accommodate the selection key of the first coupling unit.

According to aspects of the present invention, the selection key of the first coupling unit may be located at a position where the selection of the fuel cartridge is completed before the nozzle receives fuel from the fuel cartridge, due to the coupling of the fuel cartridge with the power unit.

According to aspects of the present invention, the selection key of the first coupling unit may be formed on an outer surface of the male portion, of the first coupling unit.

According to aspects of the present invention, the selection key of the first coupling unit may comprise a first fixing key, a second fixing key having a position that is fixed with respect to the first fixing key, and an auxiliary key between the first and second fixing keys.

According to aspects of the present invention, the fuel cell system may further comprise a coupler to maintain the coupling of the fuel cartridge with the power unit. The coupler can be disposed on an outer surface of the male portion of the first coupling unit, and on an inner surface of the female portion of the second coupling unit.

According to aspects of the present invention, the nozzle of the first coupling unit may form a flow channel together with a first poppet, which is moved into the power unit, when the fuel cartridge and the power unit are coupled.

According to aspects of the present invention, the fuel cell system may further comprise an elastic member that applies a force to the first poppet, in a direction towards the nozzle.

According to aspects of the present invention, the fuel cell system may further comprise an O-ring to seal an area between the first coupling unit and the power unit.

According to aspects of the present invention, the fuel cell system may further comprise a seal to seal an area between the first coupling unit and the second coupling unit, before the nozzle of the first coupling unit contacts the fuel supply path of the second coupling unit. The seal may be an O-ring accommodated in the inner surface of the second coupling unit.

According to aspects of the present invention, the first coupling unit may further comprise a second poppet that exposes the fuel supply path, of the nozzle of the first coupling unit, when the fuel cartridge and the power unit are coupled.

According to another aspect of the present invention, there is provided a fuel cell system having a power unit and a fuel cartridge coupled with the power unit. The power unit comprises: a nozzle that receives fuel supplied from the fuel cartridge; and a first poppet that is able to be moved between a first position, at which a fuel supply path of the nozzle is blocked, and a second position at which the fuel supply path is opened. The fuel cartridge comprises: the fuel supply path to supply fuel to the nozzle; and a first exposure inducing unit that moves the first poppet from the first position to the second position, when the power unit and the fuel cartridge are coupled.

According to aspects of the present invention, the fuel cartridge may further comprise a second poppet that is moved between a third position, at which the fuel supply path is blocked, and a fourth position at which the fuel supply path is exposed. The power unit comprises a second exposure inducing unit that moves the second poppet of the fuel cartridge from the third position to the fourth position, when the fuel cartridge and the power unit are coupled.

According to aspects of the present invention, the power unit may comprise a first coupling unit coupled to the fuel cartridge. The first coupling unit may comprise: a selection key to select the fuel cartridge; and a male portion to mate with the fuel cartridge, disposed around the nozzle; and a selection key disposed on the outer surface of the male portion, to selectively mate with the fuel cartridge.

According to aspects of the present invention, the selection key of the first coupling unit may be located at a position where the selection of the fuel cartridge is completed, before the nozzle receives the fuel from the fuel cartridge, due to the coupling of the fuel cartridge with the power unit.

According to aspects of the present invention, the selection key of the first coupling unit may be located about 4.6 mm (±0.01 mm) behind an end of the male portion.

According to aspects of the present invention, the nozzle of the first coupling unit may form a flow channel, together with the first poppet, when the fuel cartridge and the power unit are coupled.

According to aspects of the present invention, the fuel cartridge may comprise a second coupling unit to couple with the first coupling unit of the power unit. The second coupling unit comprises a female portion into which the male portion of the first coupling unit is inserted. A groove to accommodate the selection key is formed inside the female portion.

In the fuel cell system, according to aspects of the present invention, fuel is supplied to the power unit from the fuel cartridge, when a hole formed in the poppet of the second coupling unit is compressed by the nozzle of the power unit. The release of the poppet from the nozzle blocks the fuel supply. Thus, fuel leakage, in the process of attaching and detaching the fuel cartridge to and from the power unit, can be prevented or minimized.

According to aspects of the present invention, the arrangement of the fixing keys and the auxiliary key, provided in the coupling unit of the power unit, in particular, the location of the auxiliary key insures that only particular cartridges can be coupled to the coupling unit of the power unit. In this manner, since the auxiliary key is used as a selection key for a particular fuel cartridge, the connection of inappropriate fuel cartridge to the power unit can be prevented, and thus, the operation safety of the fuel cell system can be secured.

According to aspects of the present invention, the coupling unit of the power unit includes retention keys that can firmly maintain the coupling of the power unit with the fuel cartridge, and thus, the coupling stability of the power unit with the fuel cartridge can be secured. The fuel is supplied from the fuel cartridge to the power unit, when a sixth hole, formed in the poppet of the coupling unit of the fuel cartridge, is compressed with the nozzle of the coupling unit. The decoupling of the poppet from the nozzle begins after the fuel supply is blocked. Thus, fuel leakage, when attaching and detaching the fuel cartridge and the power unit, can be prevented or minimized.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
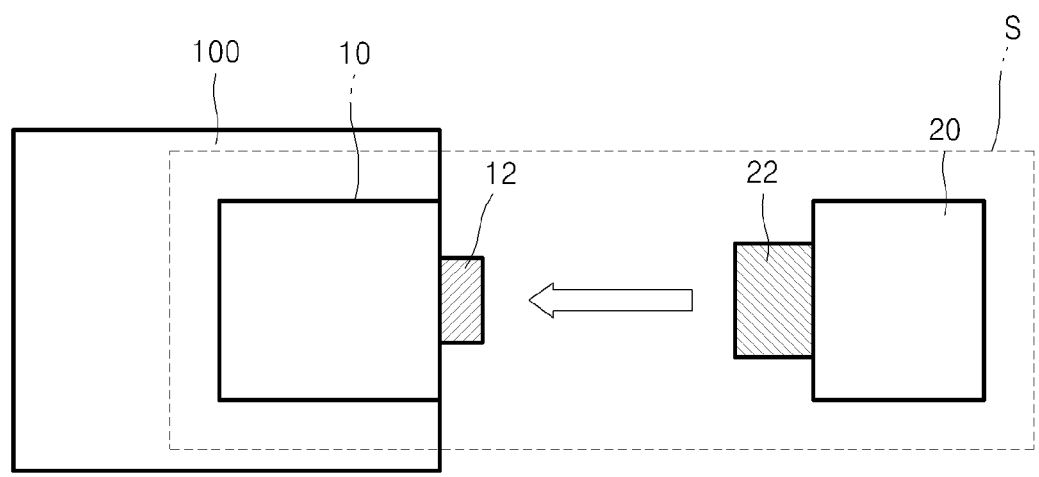
FIG. 1 is a schematic plan view of a power unit separated from a cartridge in a fuel cell system mounted in an electronic device, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a schematic plan view of a fuel cell system S mounted in an electronic device 100, according to an exemplary embodiment of the present invention. Referring to FIG. 1, the fuel cell system S includes a power unit 10 and a cartridge 20 in which fuel is stored. The power unit 10 generates electric power through an electrochemical reaction, using the fuel from the cartridge 20, and is connected to the electronic device 100. The electronic device 100 can include a fuel supply device to supply the fuel from the cartridge 20 to the power unit 10, and auxiliary devices to support the power generation and to control of the power unit 10. For example, a control circuit unit, a fuel supply device, a DC-DC converter, and an auxiliary battery can be included in the electronic device 100. The fuel supply device or the auxiliary devices can be included in the power unit 10, together with fuel cells from which power is generated.

The configuration of the fuel supply device may vary, according to the configuration of the cartridge 20. For example, if the cartridge 20 is a non-compressive type, the fuel supply device can include a pump and a valve. However, if the cartridge 20 is a compressive type, it is unnecessary to include the pump, but a valve to block fuel can be included.

Figure 2:
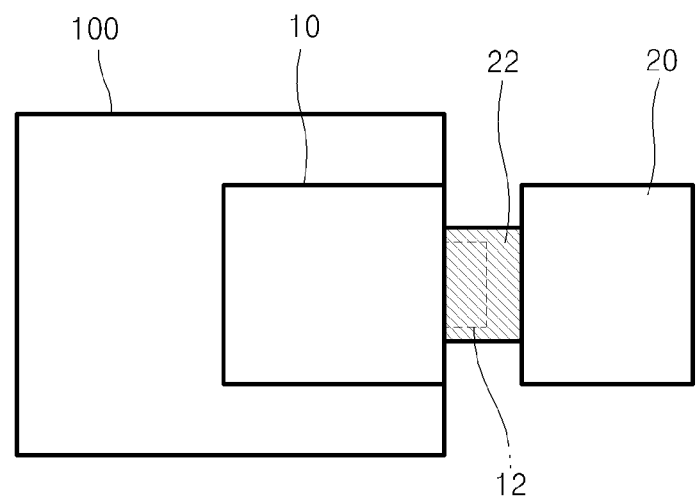
FIG. 2 is a schematic plan view of the power unit coupled with the cartridge, of the fuel cell system of FIG. 1.

The fuel supplied to the fuel cell can be, for example, methanol having a concentration suitable for an anode of the fuel cell. The cartridge 20 can be a compressive type, having a compressive element to pressurize fuel in a fuel pack, or a non-compressive type that does not have the compressive element. The power unit 10 includes a first coupling unit 12 and the cartridge 20 includes a second coupling unit 22. As depicted in FIG. 2, the first coupling unit 12 is configured to be inserted into the second coupling unit 22, when the power unit 10 is coupled with the cartridge 20. However, the present invention is not limited thereto, for example, the first coupling unit 12 can be inserted into the second coupling unit 22, in some exemplary embodiments.

The electronic device 100, on which the power unit 10 is mounted, can be one of a variety of mobile electronic products, such as, mobile computers, mobile phones, personal multimedia players (PMPs), mobile sound regenerators, such as MP3 players, and non-portable electronic products. The first coupling unit 12 can be included in the electronic device 100, as depicted in FIG. 3.

Figure 3:
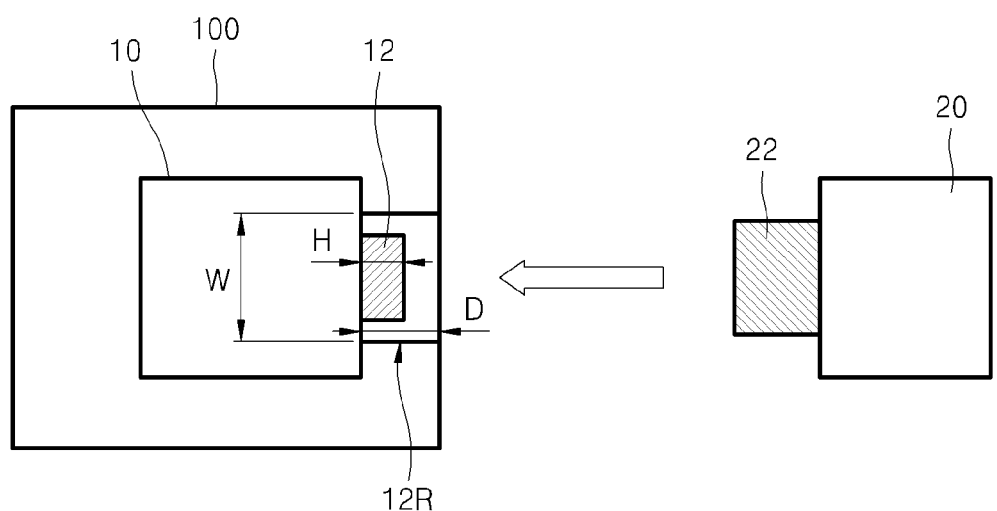
FIG. 3 is a schematic plan view of a modified version of the power unit separated from the cartridge, in the fuel system of FIG. 1, in which a nozzle of the power unit is formed in the electronic device.
Figure 4:
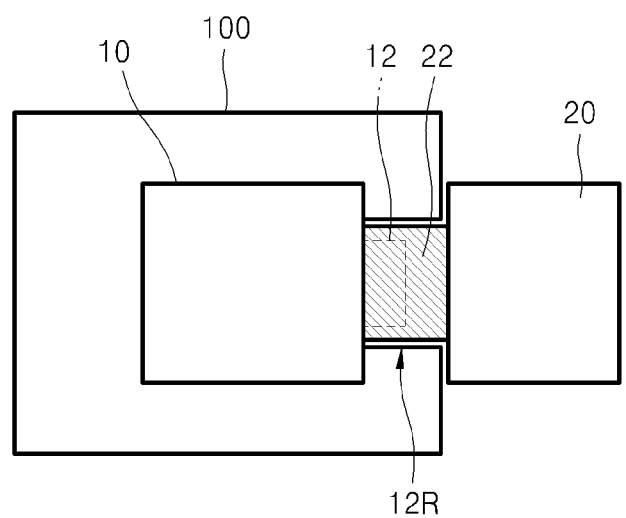
FIG. 4 is a schematic plan view of the power unit coupled with the cartridge, of the fuel cell system of FIG. 3.

Referring to FIG. 3, the power unit 10 is mounted on the electronic device 100. The electronic device 100 includes a recess 12R, in which the first coupling unit 12 can be positioned. The first coupling unit 12 has a length H that is smaller than a depth D of the recess 12R. However, the length H of the first coupling unit 12 can be equal to, or greater than, the depth D of the recess 12R. As depicted in FIG. 4, when the cartridge 20 is coupled to the power unit 10, the second coupling unit 22 of the cartridge 20 is inserted into the recess 12R, and the first coupling unit 12 is inserted into the second coupling unit 22.

Figure 5:
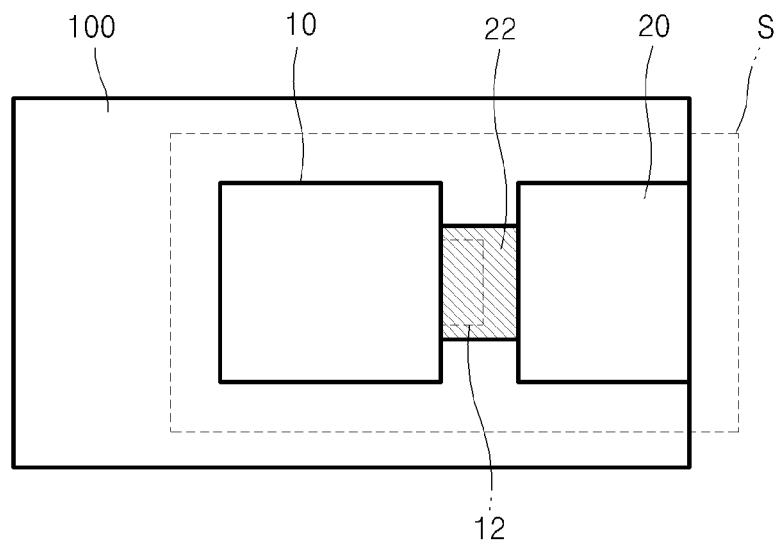
FIGS. 5 and 6 are schematic plan views of fuel cell systems built-in electronic devices, according to an exemplary embodiment of the present invention.
Figure 6:
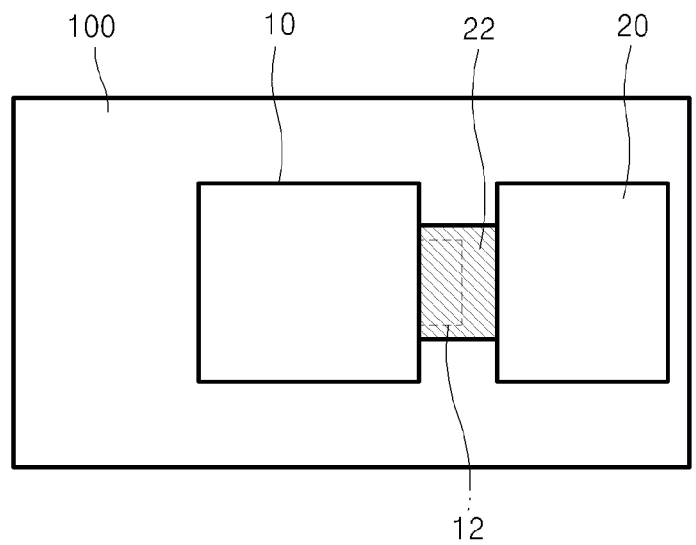

The fuel cell system S can be included in the electronic device 100. As depicted in FIG. 5, an end of the cartridge 20 can be matched with an end of the electronic device 100, or as depicted in FIG. 6, the fuel cell system S can be completely built in the electronic device 100.

Figure 7:
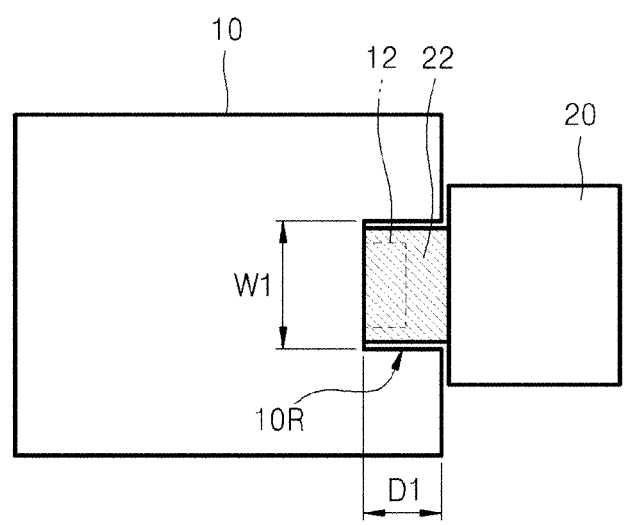
FIG. 7 is a schematic plan view of a power unit and a cartridge of a fuel cell system, in which the power unit includes a recess and a coupling unit is formed in the recess.

In the case of the fuel cell system S described above, the first coupling unit 12 protrudes outside of the power unit 10. However, as depicted in FIG. 7, the first coupling unit 12 can be included in a recess 10R formed in the power unit 10. At this point, the recess 10R may have a depth D1 and a width W1, which are equal to the depth D and width W of the recess 12R.

Figure 8:
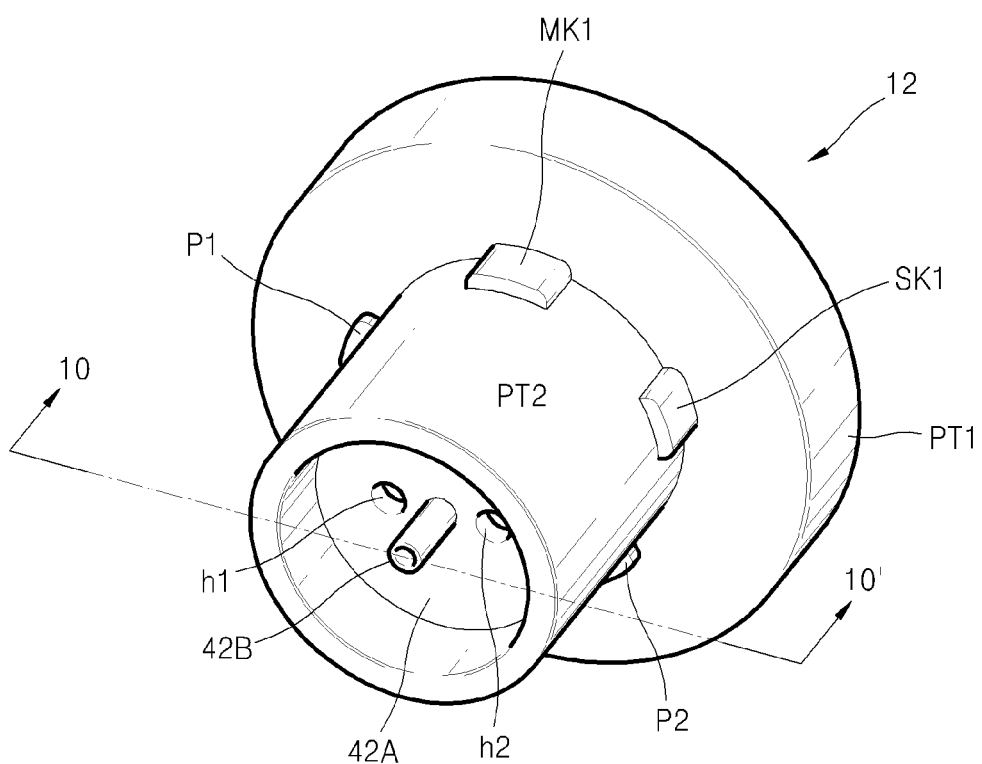
FIG. 8 is a perspective view of a power unit coupling unit to couple with the cartridges of FIGS. 1 and 3, according to an exemplary embodiment of the present invention.
Figure 9:
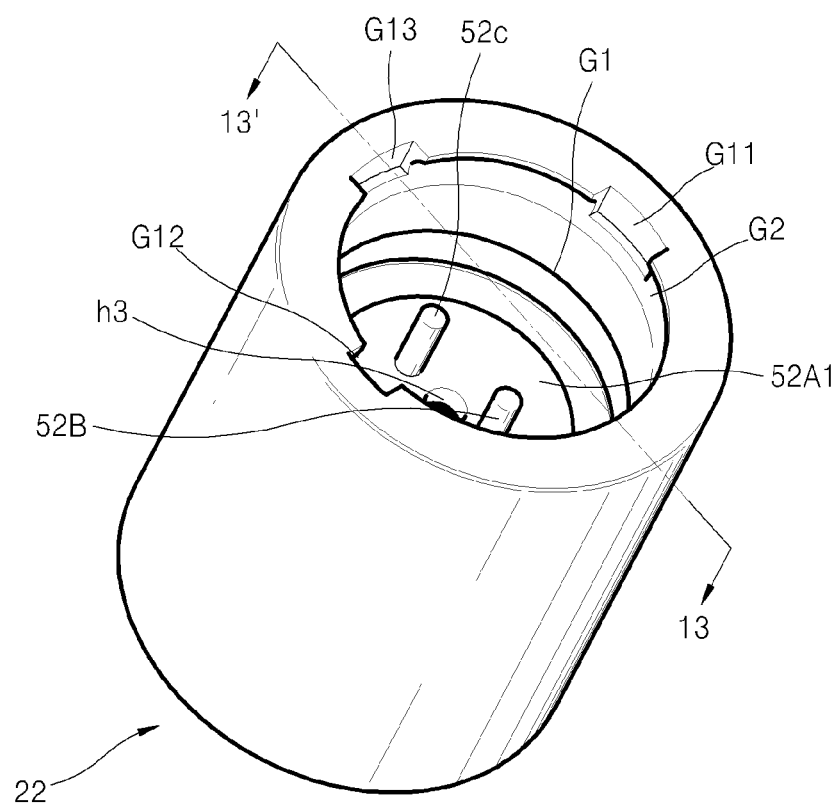
FIG. 9 is a perspective view of a cartridge coupling unit to couple with the power units in FIGS. 1 and 3, according to an exemplary embodiment of the present invention.

FIGS. 8 and 9 are perspective views of the first coupling unit 12 and the second coupling unit 22. Referring to FIG. 8, the first coupling unit 12 includes a contact unit PT1 that contacts the power unit 10, and an outer unit (male portion) PT2 that is fixed on the contact unit PT1. The male portion PT2 may be perpendicular to the contact unit PT1. The male portion PT2 is inserted into an inner circumference unit (female portion) of the second coupling unit 22. The male portion PT2 may have a cylindrical shape, and can be hollow. The male portion PT2 can have, for example, a non-cylindrical shape, an ovoid shape, or a rectangular shape.

The male portion PT2 defines an inner space, which is divided into an outer portion OA1, and an inner portion IA1 (refer to FIG. 10), by a middle plate 42A. The middle plate 42A is located at a predetermined depth from an outer end of the male portion PT2. An outer surface of the middle plate 42A, that is, a surface of the middle plate 42A that faces the second coupling unit 22, when it is coupled to the second coupling unit 22, includes a nozzle 42B. The nozzle 42B is perpendicular to the middle plate 42A, and is surrounded by the male portion PT2. The nozzle 42B is fixed on the middle plate 42A, and penetrates the center of the middle plate 42A. The nozzle 42B may have an inner diameter of 1.5 mm, or less, for example, 0.8 mm (±0.01 mm), and an outer diameter of 3.5 mm, or less, for example, 2.5 mm (±0.01 mm). A first hole h1 and a second hole h2 are formed in the middle plate 42A, around the nozzle 42B. When the cartridge 20 is coupled with the power unit 10, first and second protrusion units 52B and 52C (refer to FIG. 9) are inserted into the first hole h1 and the second hole h2, respectively.

When the power unit 10 is coupled with the cartridge 20, a poppet 42C (refer to FIG. 10), included in the first coupling unit 12, is moved by the first and second protrusion units 52B and 52C, and thus, a fuel supply path of the nozzle 42B is opened. Thus, the first and second protrusion units 52B and 52C of the cartridge 20 perform as an exposure inducing unit, to open the fuel supply path of the nozzle 42B, which will be described later. The first and second holes h1 and h2 may be the same. However, the shapes and the diameters may be different from each other. The first and second holes h1 and h2 are generally symmetrically disposed with respect to the nozzle 42B. The first and second holes h1 and h2, and the nozzle 42B, may be located on the same line.

A first fixing key MK1, an auxiliary key SK1, and first and second retention keys P1 and P2 are formed on a portion of the male portion PT2, close to the contact unit PT1, that is, on a lower circumference of the male portion PT2. Although not shown in FIG. 8, a second fixing key MK2 (refer to FIG. 22) is formed on an opposite side to the first fixing key MK1. The first and second retention keys P1 and P2 can be referred to as a coupler that can couple the first and second coupling units 12 and 22, and are positioned facing each other.

The coupler, such as, the first and second retention keys P1 and P2, can be formed on an outer circumference of the male portion PT2, and can be located close to the nozzle 42B, and can be closer to the nozzle 42B than selection keys, which will be described later. The location of the auxiliary key SK1 can be changed. The first and second fixing keys MK1 and MK2, and the auxiliary key SK1 can be used to recognize, or select, the type of cartridge 20. In other words, the keys MK1, MK2 and SK1 can be configured to selectively mate only with (accept) particular types of cartridges. The selection keys can be formed on an outer circumference of the contact unit PT1. The end of the nozzle 42B can be positioned between the selection keys and the end of the contact unit PT1.

The selection keys can be located at positions where the selection keys are completely inserted into a corresponding region of the cartridge 20, for example, grooves, from a point when the nozzle 42B first experiences a force, until the power unit 10 is completely coupled with the cartridge 20, in the course of coupling the power unit 10 with the cartridge 20. In other words, the selection keys can be located at positions where the cartridge 20 can be accepted, before the nozzle 42B receives fuel from the cartridge 20, due to the coupling of the power unit 10 with the cartridge 20.

The first and second retention keys P1 and P2 can be elements to maintain the coupling of the first coupling unit 12 with the second coupling unit 22. Even though the first and second retention keys P1 and P2 are not big, they can be formed of a material having elasticity.

Referring to FIG. 9, the second coupling unit 22 of the cartridge 20 has a cylindrical shape. The second coupling unit 22, like the first coupling unit 12, can be generally cylindrical, or generally rectangular. The second coupling unit 22 has a hollow space. The hollow space of the second coupling unit 22 is divided into an outer portion OA1 (refer to FIG. 13) and an inner portion IA2 (refer to FIG. 13), by a protrusion structure 52A (refer to FIG. 13 or FIG. 14). A poppet is located in the inner portion and the outer portion defines a female portion 22P of the second coupling unit 22 (refer to FIG. 13), to which the male portion PT2 of the first coupling unit 12 is inserted.

An upper plate 52A1 of the protrusion structure 52A is positioned at a predetermined depth from an upper end of the second coupling unit 22. A third hole h3 is formed in the center of the upper plate 52A1. When the power unit 10 is coupled with the cartridge 20, the nozzle 42B of the first coupling unit 12 passes through the third hole h3. Thus, the third hole h3 may have a greater diameter than that of the nozzle 42B. Also, the diameter of the third hole h3 may gradually narrow, from an outer surface to an inner surface of the upper plate 52A1. In other words, the inner surface of the third hole h3 may be an oblique surface, not a vertical surface. The diameter of the third hole h3 at the inner surface, may be equal to, or greater than, an outer diameter of the nozzle 42B.

The first and second protrusion units 52B and 52C are perpendicular to an outer surface of the upper plate 52A1, and have a predetermined length towards the outside. However, the length of the first and second protrusion units 52B and 52C is not long enough to reach the upper end of the second coupling unit 22. When the power unit 10 and the cartridge 20 are coupled, the first and second protrusion units 52B and 52C pass through the first and second holes h1 and h2.

The first and second protrusion units 52B and 52C can be symmetrically disposed with respect to the third hole h3. The first and second protrusion units 52B and 52C, and the third hole h3 can be on the same line. First and second circular grooves G1 and G2 are formed on an inner circumference of the female portion 22P (refer to FIG. 13), between the upper plate 52A1 and an upper end of the second coupling unit 22.

Figure 14:
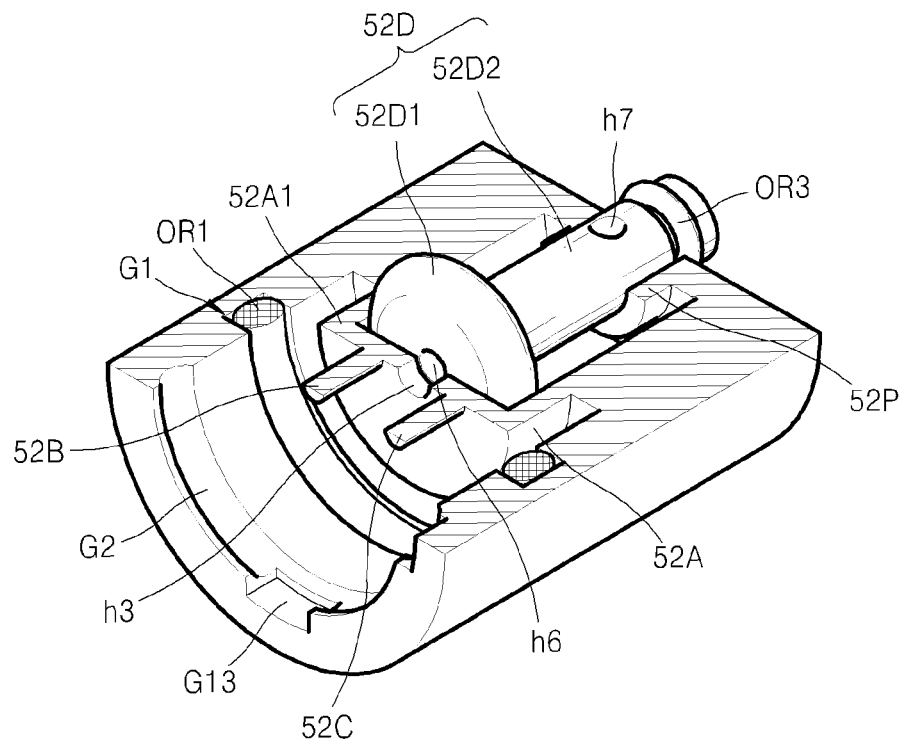
FIGS. 14 and 15 are perspective cross-sectional views of the cartridge coupling unit of FIG. 13, according to an exemplary embodiment of the present invention.
Figure 15:
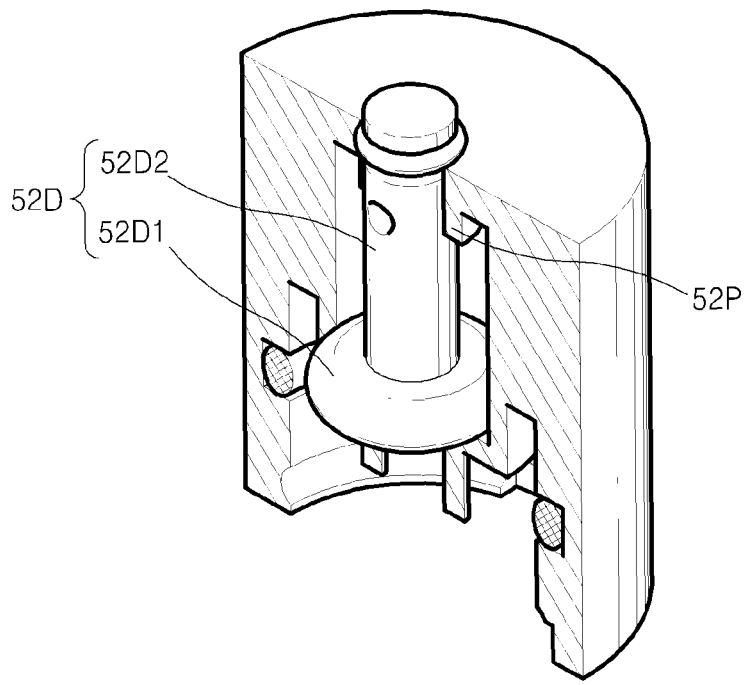

As depicted in FIGS. 14 and 15, an O-ring OR1 is provided in the first circular groove G1, which is relatively close to the upper plate 52A1. The O-ring OR1 is a seal, and when the power unit 10 and the cartridge 20 are coupled, the O-ring OR1 seals the first and second coupling units 12 and 22, before the nozzle 42B of the first coupling unit 12 contacts the fuel supply path of the second coupling unit 22, for example, before the nozzle 42B contacts a sixth hole h6 of the second poppet 52D. That is, when the power unit 10 and the cartridge 20 are coupled, the O-ring OR1 tightly contacts the outer surface of the male portion PT2, before the nozzle 42B contacts the sixth hole 6h. Accordingly, while the power unit 10 and the cartridge 20 are coupled, an area, between the male portion PT2 and the inner side of the O-ring OR1, is completely sealed.

The second circular groove G2 is formed close to the upper end of the second coupling unit 22. The second circular groove G2 can be referred to as a cartridge side-coupler, which couples with the first and second retention keys P1 and P2, which can be referred to as a power unit side coupler. When the power unit 10 and the cartridge 20 are coupled, the second circular groove G2 accommodates the first and second retention keys P1 and P2, which are present on a lower outer circumference of the male portion PT2, of the first coupling unit 12 of the power unit 10. The first and second protrusion units 52B and 52C can have a predetermined length, so that ends of the first and second protrusion units 52B and 52C can be located between the first circular groove G1 and the second circular groove G2.

First through third grooves G11, G12, and G13 are formed along an inner surface of the second coupling unit 22, that is, around an inner circumference of the second coupling unit 22. Ends of the first through third grooves G11, G12, and G13 are located in the second circular groove G2. The first through third grooves G11, G12, and G13 are formed to accommodate the selection keys formed on the outer circumference of the male portion PT2, when the power unit 10 and the cartridge 20 are coupled. In other words, the first and second grooves G11 and G12 are formed to accommodate the first and second fixing keys MK1 and MK2, and the third groove G13 is formed to accommodate the auxiliary key SK1. Thus, the length, depth, and width of each of the first and second grooves G11 and G12, may be determined according to the length, thickness, and width of the first and second fixing keys MK1 and MK2. The position of the auxiliary key SK1 can be varied, so as to accept different types of cartridges, and thus, the position of the third groove G13 can also be varied, so as to accept different types of cartridges.

Figure 10:
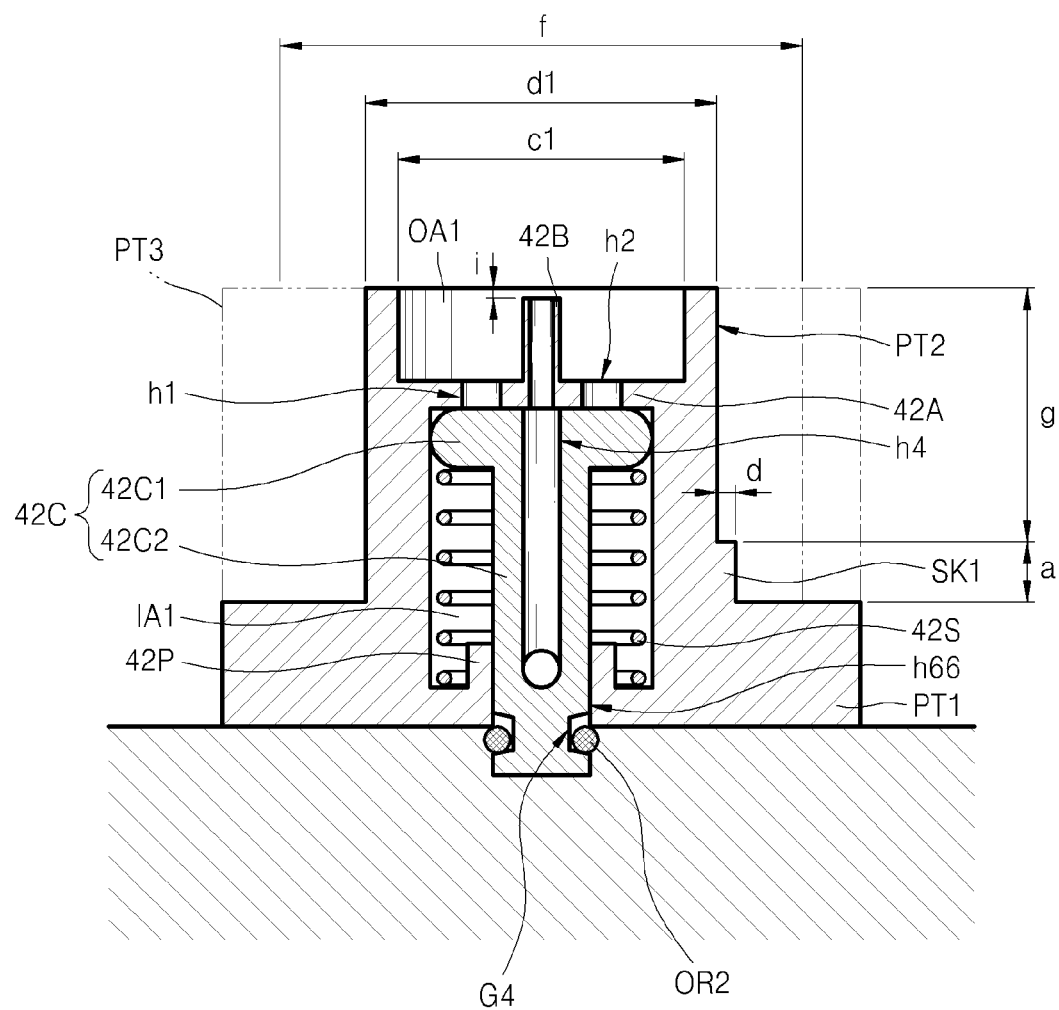
FIG. 10 is a cross-sectional view taken along line 10-10', of the power unit coupling unit of FIG. 8.

FIG. 10 is a cross-sectional view taken along line 10-10' of the first coupling unit 12 of FIG. 8. The male portion PT2 encompasses an inner space that is divided into an outer portion OA1 and an inner portion IA1, by the middle plate 42A.

Referring to FIG. 10, the inner portion IA1 extends to an inner side of the contact unit PT1. A first poppet 42C is present in the inner portion IA1. A portion of the first poppet 42C moves into the power unit 10, when the power unit 10 and the cartridge 20 are coupled. For convenience of explanation, a head portion 42C1 and a tail portion 42C2, of the first poppet 42C, are separately described. The head portion 42C1 has a circular shape, and a predetermined thickness.

A fourth hole h4 is formed in the center of the head portion 42C1. The fourth hole h4 exists on the same line as the nozzle 42B. Thus, as depicted in FIG. 10, when the first poppet 42C contacts the middle plate 42A, the nozzle 42B extends in the first poppet 42C, through the fourth hole h4. The fourth hole h4 extends in the tail portion 42C2.

A circular groove G4 is formed in a lower part of the tail portion 42C2. The fourth hole h4 is formed near the circular groove G4. The fourth hole h4 is a tube having a predetermined length. An end of the fourth hole h4 is connected to a fifth hole h5 (refer to FIG. 21).

Figure 21:
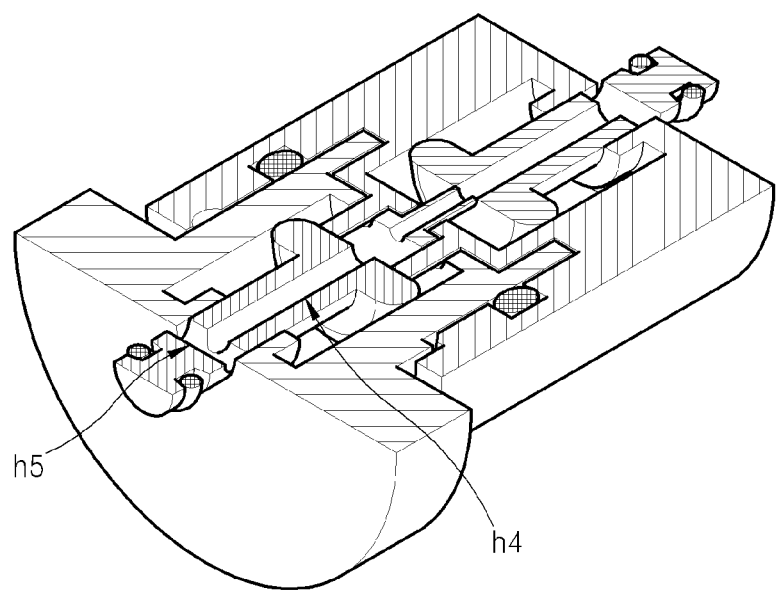
FIG. 21 is a perspective view showing a cross-section of the power unit and the cartridge of FIG. 19, in the method described with reference to FIGS. 16 through 19.

Referring to FIG. 21, the fifth hole h5 penetrates through the tail portion 42C2, in a direction perpendicular to the fourth hole h4. Thus, the fifth hole h5 is also a tube. In this way, the fourth hole h4 and the fifth hole h5 form a portion of a fuel supply path that supplies fuel through the nozzle 42B to the power unit 10. Thus, when the power unit 10 and the cartridge 20 are coupled, a portion of the fifth hole h5 is moved into the power unit 10, so that the fifth hole h5 can be exposed in the power unit 10. The first poppet 42C, in which the fourth hole h4 and the fifth hole h5 are formed, and the nozzle 42B, form the fuel supply path.

As it is seen in FIG. 21, when the first coupling unit 12 of the power unit 10 and the second coupling unit 22 of the cartridge 20 are coupled, the first poppet 42C is pushed towards the power unit 10, by the first and second protrusion units 52B and 52C of the cartridge 20. As a result, a lower portion of the tail portion 42C2 protrudes outside of a through hole h66. Thus, the fifth hole h5 may be exposed outside of the through hole h66, when the coupling is completed.

In the above coupling, a portion of a fuel supply path 42BA (refer to FIG. 19), of the nozzle 42B, is exposed, while the first poppet 42C is pushed by the first and second protrusion units 52B and 52C. The exposed portion of the fuel supply path 42BA faces the power unit 10. Prior to the coupling, the exposed portion of the fuel supply path 42BA is not exposed, since it contacts the first poppet 42C. Thus, the first and second protrusion units 52B and 52C of the cartridge 20 may be referred to as an exposure inducing unit that exposes the fuel supply path 42BA, when the power unit 10 and the cartridge 20 are coupled.

Referring to FIG. 10 again, a second O-ring OR2 is accommodated in the circular groove G4. As depicted in FIG. 10, when the first poppet 42C contacts the inner surface of the middle plate 42A, and covers the first and second holes h1 and h2, the second O-ring OR2 seals an area between a side wall of the through hole h66 and the tail portion 42C2 that passes through the through hole h66. Accordingly, in a state in which fuel supply from the cartridge 20 is stopped, the back flow of fuel supplied to the power unit 10, through the area between the side wall of the through hole h66 and the tail portion 42C2, can be prevented.

The through hole h66 may extend into the inner portion IA1, to a predetermined position that is higher than a bottom of the inner portion IA1, around the through hole h66. Thus, a protrusion unit 42P, that is, a cylindrical wall having a predetermined height, may be formed between the through hole h66 and the inner portion IA1. A first elastic member 42S may be formed in the inner portion IA1. The first elastic member 42S may be, for example, a spring. The first elastic member 42S may surround a portion of the tail portion 42C2. The first elastic member 42S biases the head portion 42C1 towards the middle plate 42A, by using the bottom of the inner portion IA1 as a support. In other words, the head portion 42C1 is biased towards the middle plate 42A, due to the first elastic member 42S.

The elastic force of the first elastic member 42C is increased when the first poppet 42C moves away from the middle plate 42A, when the power unit 10 and the cartridge 20 are coupled. When the power unit 10 and the cartridge 20 are uncoupled, the first poppet 42C moves to the original position. As the first poppet 42C is forced towards the middle plate 42A, due to the first elastic member 42S, the O-ring accommodated in the circular groove G4 also receives pressure towards the middle plate 42A. Thus, in a state in which the fuel supply from the cartridge 20 is stopped, the sealing force of the second O-ring OR2 may be increased.

In FIG. 10, a step difference i is present between the nozzle 42B and the male portion PT2, since the end of the nozzle 42B is lower than the end of the male portion PT2. The step difference i may be, for example, 4 mm, or less, for example, 3.1 mm (±0.05 mm). The auxiliary key SK1 may have a height a of 3.0 mm, or less, for example, 1.5 mm (±0.01 mm), and a thickness b of 2 mm, or less, for example, 0.5 mm (±0.01 mm). Since the first and second fixing keys MK1 and MK2 (refer to FIG. 8) have a height and thickness equal to the auxiliary key SK1, the height a and the thickness b of the auxiliary key SK1 can be the same as that of the first and second fixing keys MK1 and MK2. Also, the short cut g, from the end of the male portion PT2 to the first and second fixing keys MK1 and MK2, or the auxiliary key SK1, may be 6 mm, or less, for example, 4.6 mm (±0.01 mm). This denotes that the selection keys, such as, the first and second fixing keys MK1 and MK2, and the auxiliary key SK1, may be 4.6 mm back from the end of the male portion PT2. Also, the male portion PT2 may have an outer diameter d1 of 10 mm, or less, for example, 7.4 mm (±0.01 mm). Also, the male portion PT2 may have an inner diameter c1 (which is equal to the outer diameter of the outer portion OA1) that surrounds the nozzle 42B of 7 mm, or less, for example, 4.8 mm (±0.01 mm).

Meanwhile, as depicted in dotted lines in FIG. 10, a second female portion PT3, which is concentric with the male portion PT2, and is parallel to the male portion PT2, may further be included on the contact unit PT1. The second female portion PT3 may be formed to surround the male portion PT2, in another exemplary embodiment. If the second female portion PT3 is present in the first coupling unit 12, the outer surface of the second coupling unit 22 may contact an inner surface of the second female portion PT3, when the power unit 10 and the cartridge 20 are coupled. The second female portion PT3 my have an inner diameter f of, for example, 16 mm, or less, for example, 13.0 mm (+0.02 mm). In FIG. 3, the side wall of the recess 12R may be the second female portion PT3.

Figure 11:
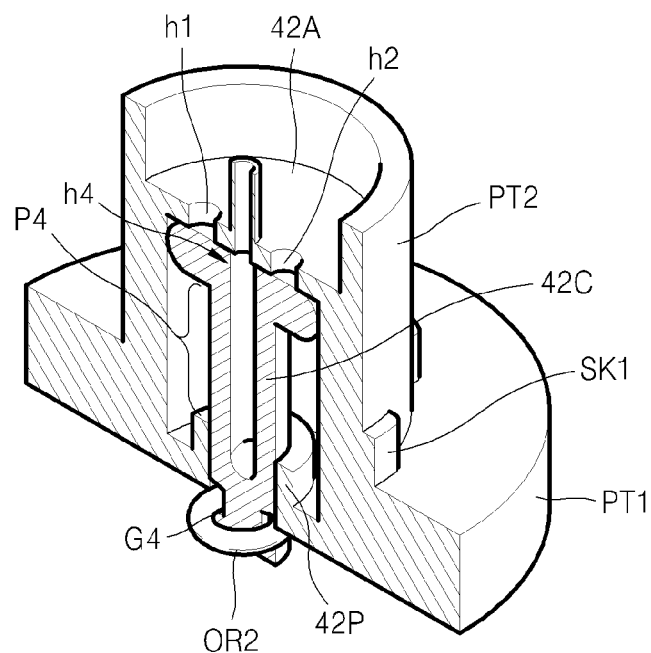
FIGS. 11 and 12 are perspective views showing cross-sections of the power unit coupling unit of FIG. 10, according to an exemplary embodiment of the present invention.
Figure 12:
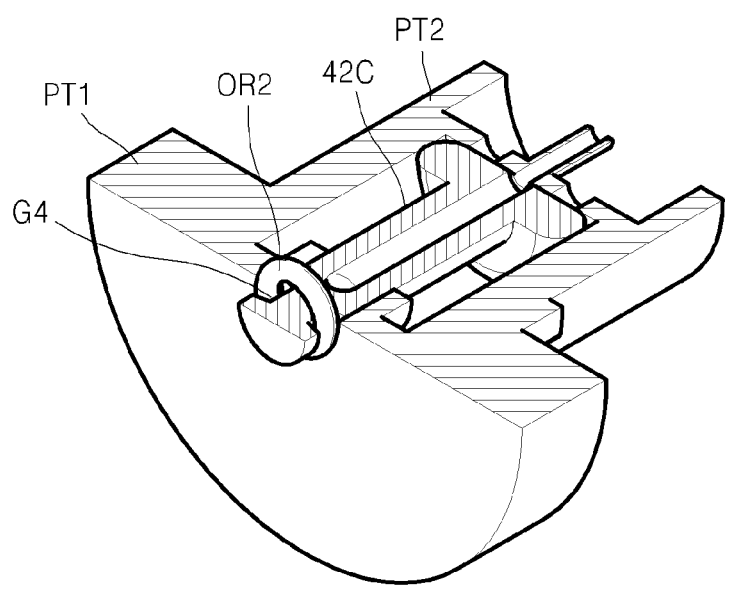

FIGS. 11 and 12 are perspective views of the first coupling unit 12, having a cross-section of FIG. 10, as seen from different directions. In FIGS. 11 and 12, the shape of the O-ring OR2, accommodated in the circular groove G4, can be clearly seen, and in FIG. 12, a three dimensional shape of the first poppet 42C can be seen. For convenience of drawing, in FIGS. 11 and 12, the first elastic member 42S (refer to FIG. 10) that surrounds a portion P4 of the tail portion 42C2 is not depicted.

Figure 13:
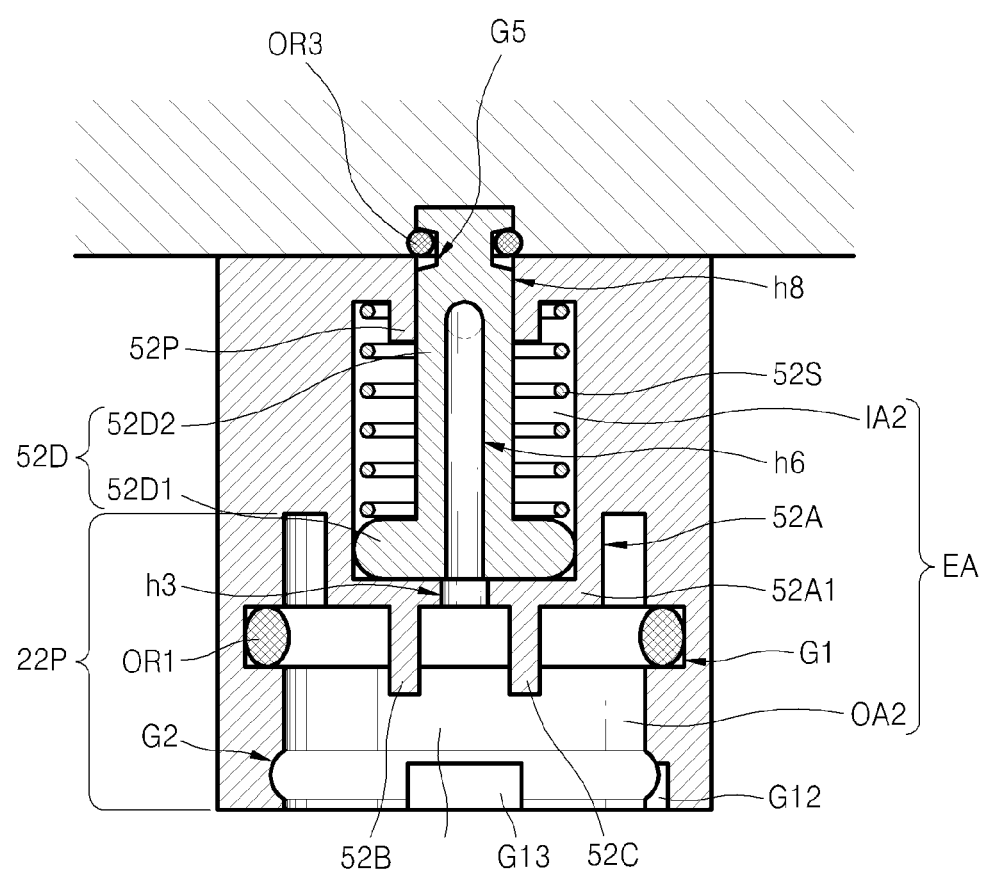
FIG. 13 is a cross-sectional view taken along line 13-13', of the cartridge coupling unit of FIG. 9.

FIG. 13 is a cross-sectional view of the second coupling unit 22 of the cartridge 20 taken along line 13-13' of FIG. 9. FIGS. 14 and 15 are perspective cross-sectional views of the second coupling unit 22 of FIG. 13 as seen from different directions.

Referring to FIGS. 13 through 15, an inner space EA of the second coupling unit 22 is divided into an outer portion OA2 and an inner portion IA2, by a protrusion structure 52A. When the power unit 10 and the cartridge 20 are coupled, the outer portion OA2 may be filled with the male portion PT2 of the first coupling unit 12. During coupling, the nozzle 42B pushes the second poppet 52D, provided in the inner portion IA2, by entering the inner portion IA2, through the third hole h3 formed in the upper plate 52A1 of the protrusion structure 52A. Thus, the nozzle 42B may be positioned in the inner portion IA2, when the coupling of the power unit 10 and the cartridge 20 is completed.

The second poppet 52D may have the same shape and structure as the first poppet 42C. That is, the second poppet 52D, like the first poppet 42C, may include a sixth hole h6 having a tube shape, and a seventh hole h7 that penetrates through the second poppet 52D, in a direction perpendicular to the sixth hole h6, which may also have a tube shape. Fuel stored in the cartridge 20 is supplied to the nozzle 42B of the first coupling unit 12, through the sixth and seventh holes h6 and h7.

A head portion 52D1 of the second poppet 52D contacts an inner surface of the upper plate 52A1 of the protrusion structure 52A, so that the sixth hole h6 can match the third hole h3 formed in the upper plate 52A1. Also, the head portion 52D1 tightly contacts an inner surface of the inner portion IA2. The tail portion 52D2 of the second poppet 52D may include a circular groove G5, and a third O-ring OR3 accommodated in the circular groove G5. The shape and size of the circular groove G5, and the relative position of the circular groove G5, with respect to the holes formed in the second poppet 52D, may be identical to the shape and size of the circular groove G4, and the relative position with respect to the holes formed in the first poppet 42C. A protrusion unit 52P that faces the upper plate 52A1, may be formed on a bottom of the inner portion IA2 of the second coupling unit 22, and an eighth hole h8 may be formed in the protrusion unit 52P.

The tail portion 52D2 of the second poppet 52D protrudes into a fuel pack (not shown) of the cartridge 20, through the eighth hole h8, because the tail portion 52D2 is pushed by the nozzle 42B, during the coupling of the power unit 10 and the cartridge 20. When the coupling is completed, the seventh hole h7, formed in the tail portion 52D2, protrudes outside of the eighth hole h8, and contacts fuel stored in the fuel pack. Thus, when the coupling is completed, the fuel stored in the fuel pack may be supplied through the seventh hole h7. The seventh hole h7 may be exposed after the coupling is completed, that is, the fuel may be not supplied immediately after the coupling begins.

The third O-ring OR3 of the second poppet 52D seals a gap between a sidewall of the eighth hole h8 and the tail portion 52D2 of the second poppet 52D, when the fuel supply through the seventh hole h7 is stopped. When the coupling is released, the seventh hole h7 enters the eighth hole h8, as the second poppet 52D returns to the original position, the fuel supply is blocked. Afterwards, as the third O-ring OR3 returns to its uncoupled position, the nozzle 42B is separated from the second poppet 52D. Thus, fuel leakage can be prevented, or minimized, when the power unit 10 is released from the cartridge 20.

A second elastic member 52S is provided in the inner portion IA2 of the second coupling unit 22. The second elastic member 52S biases the second poppet 52D towards the first coupling unit 12. The second elastic member 52S may be identical to the first elastic member 42S. The second elastic member 52S may be, for example, a spring disposed around the tail portion 52D2. The second elastic member 52S applies a force to the head portion 52D1 of the second poppet 52D, in a direction towards the upper plate 52A1, by using the bottom of the inner portion IA2, around the eighth hole h8, as a support. For convenience of drawing, the second elastic member 52S is not depicted in FIGS. 14 and 15.

Figure 16:
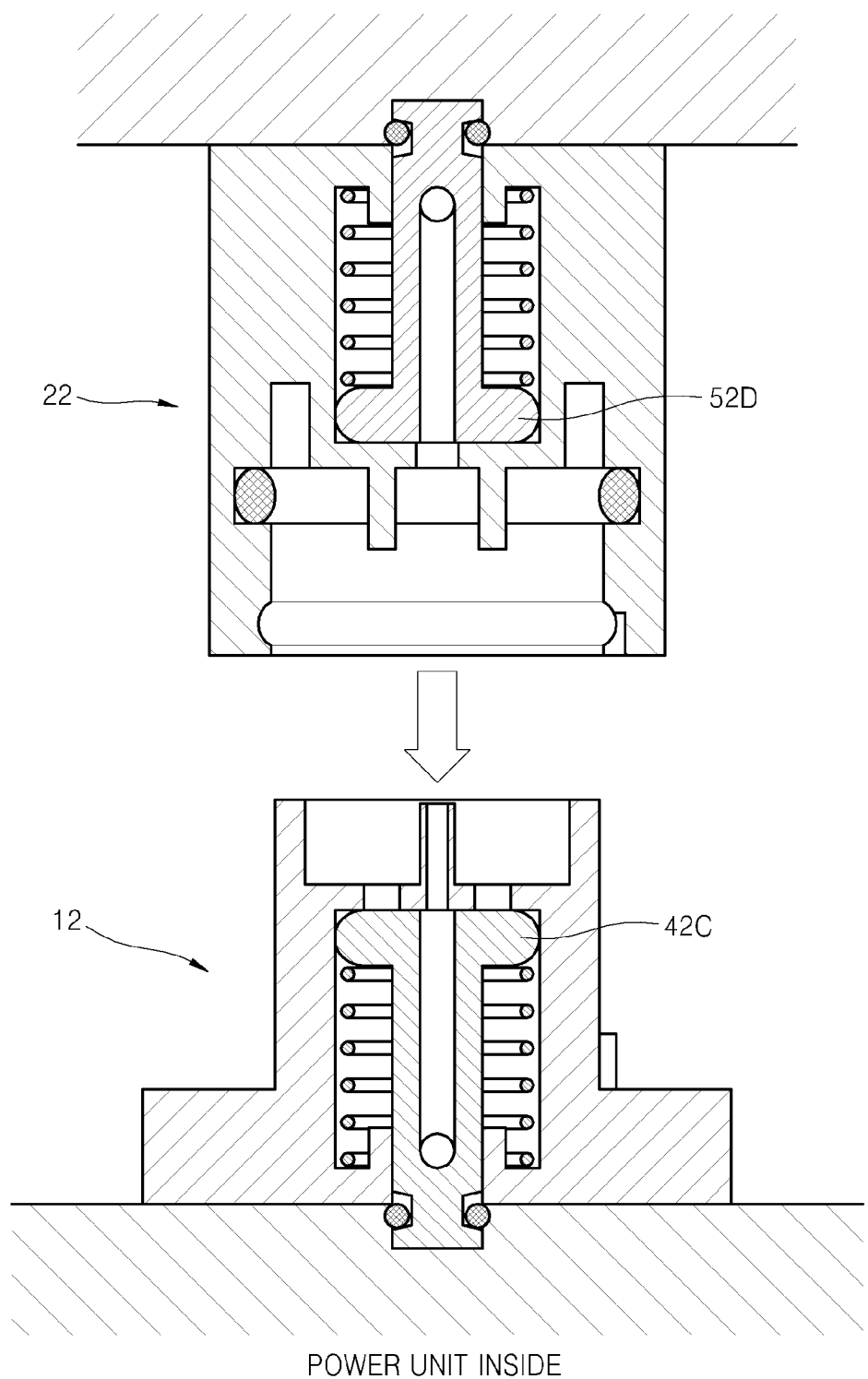
FIGS. 16 through 19 are cross-sectional views for explaining a method of coupling the power unit side-coupling unit of FIG. 10, with the cartridge coupling unit of FIG. 13.
Figure 17:
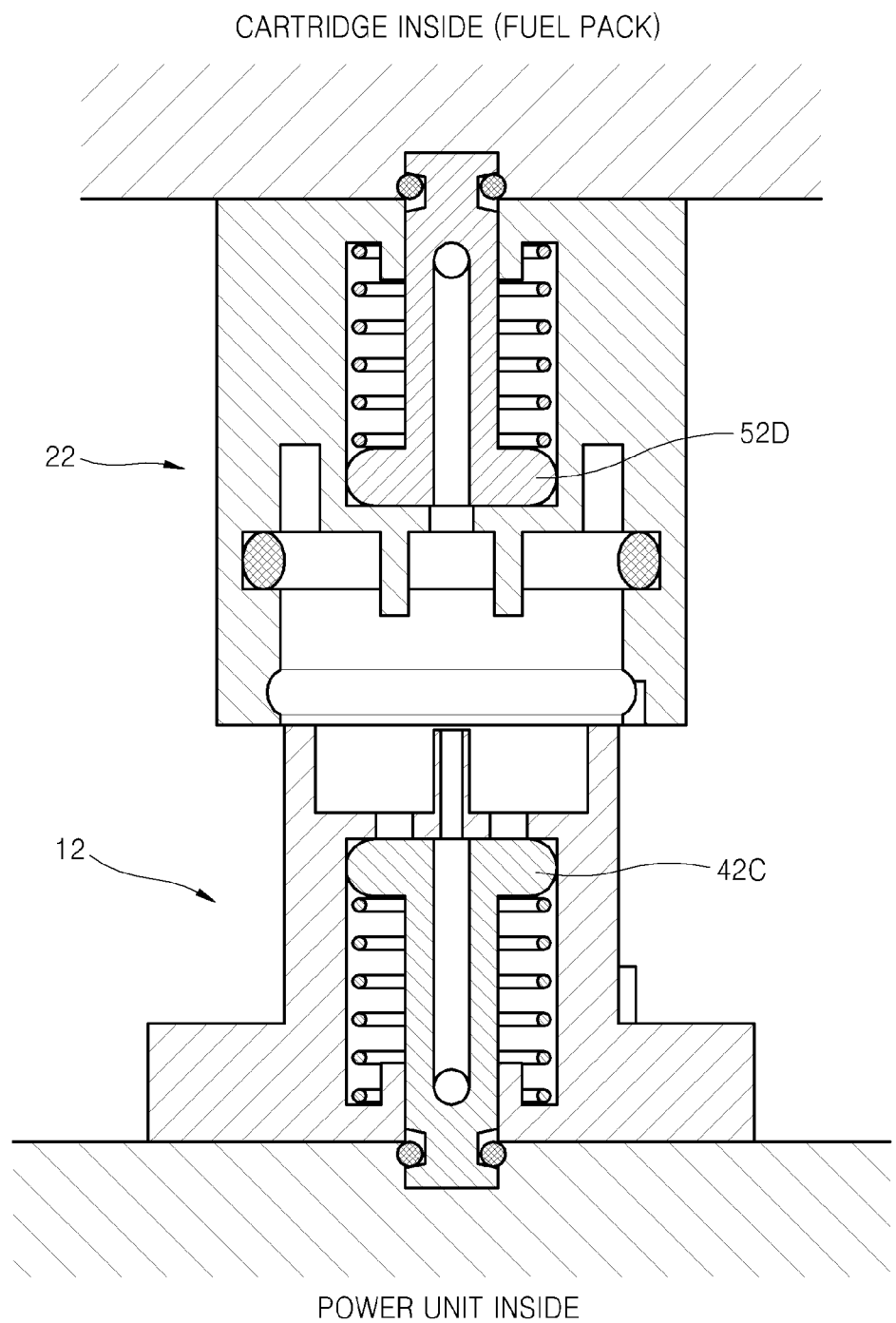

FIGS. 16 through 19 are cross-sectional views showing coupling of the first coupling unit 12 and the second coupling unit 22, when the power unit 10 and the cartridge 20 are coupled. FIG. 16 shows a cross-sectional view of the first coupling unit 12 and the second coupling unit 22, when separated from each other. FIG. 17 is a cross-sectional view of when the first coupling unit 12 arrives at an inlet of the second coupling unit 22.

Figure 18:
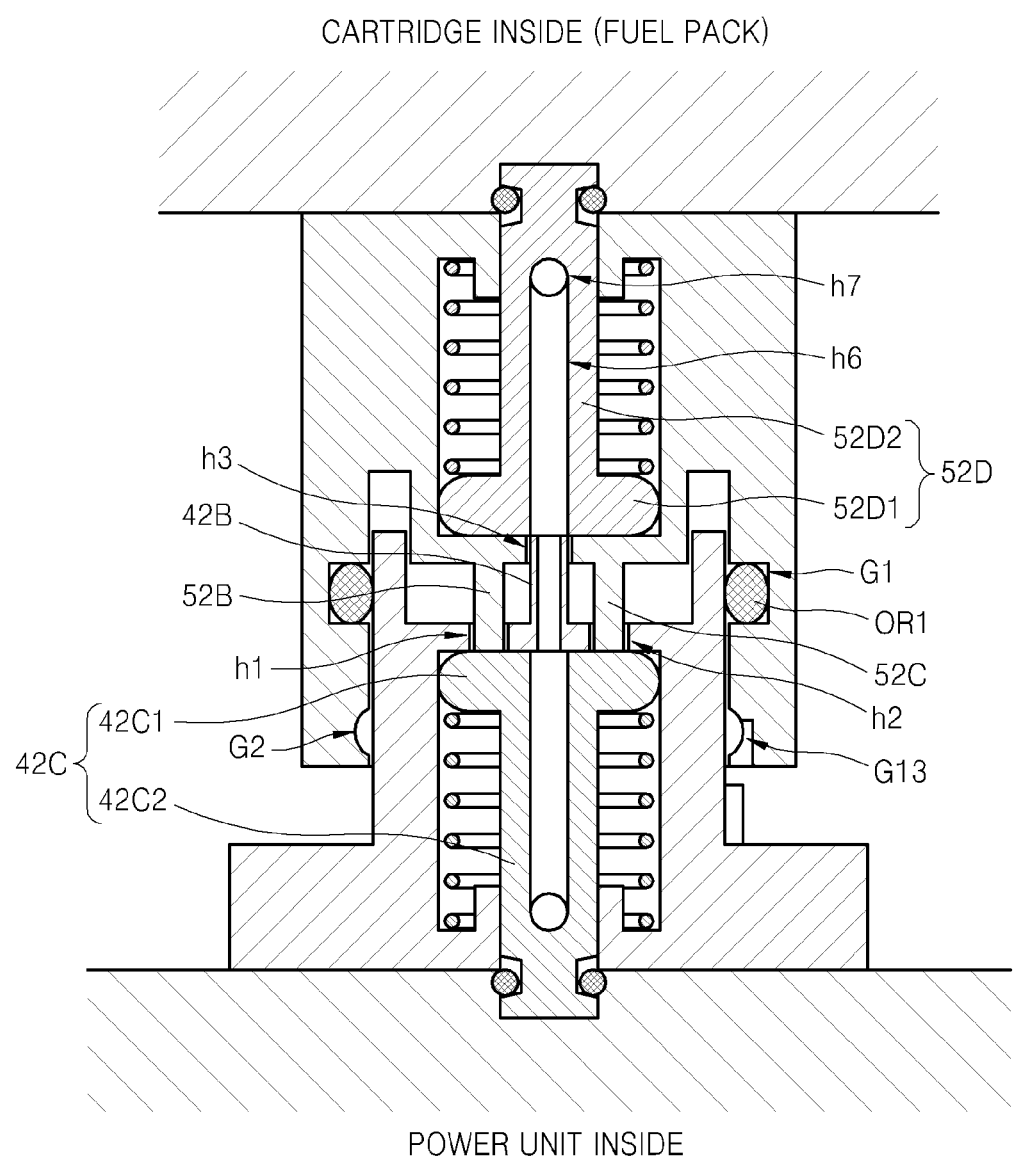

FIG. 18 is a cross-sectional view showing a state in which, due to the progress of the first coupling unit 12 into the second coupling unit 22, the nozzle 42B passes through the third hole h3 of the upper plate 52A1, and contacts the sixth hole h6 of the second poppet 52D. The first and second protrusion units 52B and 52C of the second coupling unit 22 pass through the first and second holes h1 and h2, and contact the first poppet 42C.

Referring to FIG. 18, in a simple contact state of the nozzle 42B with the second poppet 52D, the outer surface of the male portion PT2 contacts the O-ring OR1, and the end of the male portion PT2 contacts a sidewall of the protrusion structure 52A of the second coupling unit 22. As a result, a seal is formed between the outer circumference of the male portion PT2 and the second coupling unit 22. The first through third grooves G11, G12, and G13, and the first and second fixing keys MK1 and MK2 and the auxiliary key SK1, corresponding to the first through third grooves G11, G12, and G13, may be in a state in which coupling begins, or in a state immediately before the coupling begins. Thus, the acceptance of cartridge 20 may be completed, prior to receiving fuel through the nozzle 42B.

Referring to FIGS. 16 through 18, the first poppet 42C contacts the nozzle 42B. In this position, the fuel supply path of the nozzle 42B faces the inside of the power unit 10, that is, a portion of the nozzle 42B facing the first poppet 42C is not exposed. The fifth hole h5 of the first poppet 42C is not exposed inside the power unit 10. Thus, the first poppet 42C blocks the fuel from entering through the nozzle 42B. This position of the first poppet 42C is referred to as a first position of the first poppet 42C.

The second poppet 52D of the second coupling unit 22 contacts the bottom surface of the upper plate 52A1 of the protrusion structure 52A. In this state, since the seventh hole h7 of the second poppet 52D is not exposed, the fuel is not supplies through the second poppet 52D. This position of the second poppet 52D is referred to as a third position of the second poppet 52D.

Figure 19:
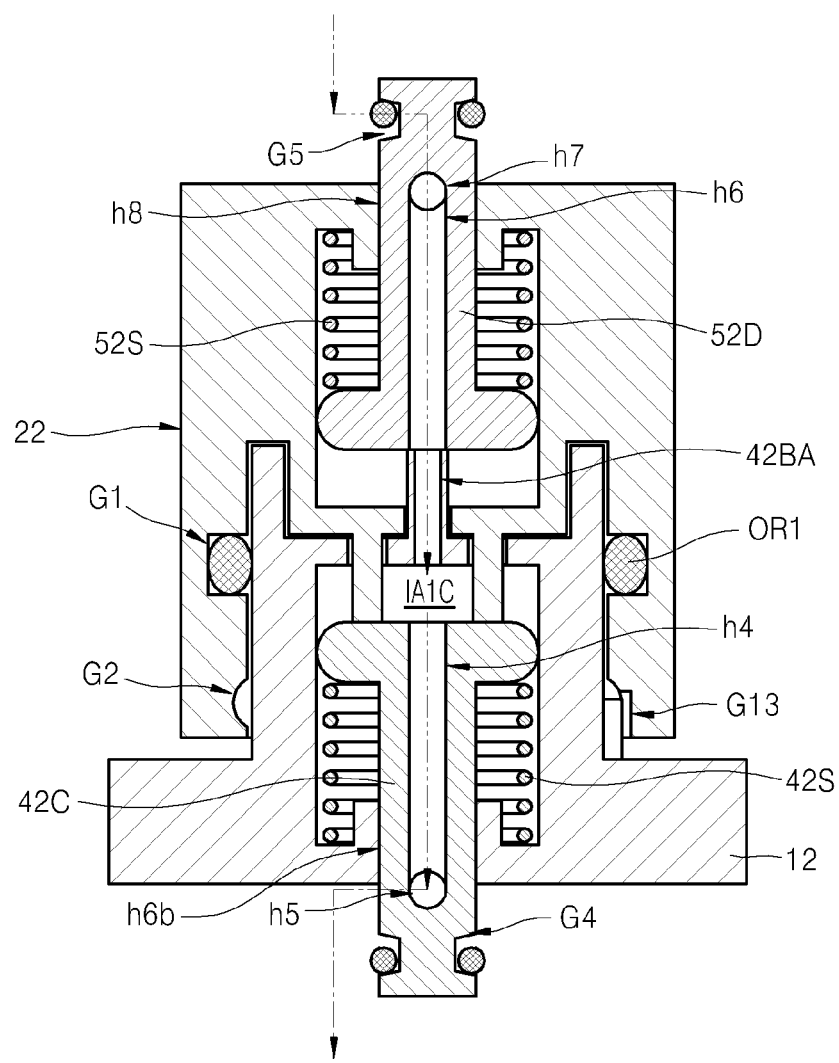

FIG. 19 is a cross-sectional view of a completely coupled state of the first coupling unit 12 and the second coupling unit 22. Referring to FIG. 19, the second poppet 52D is compressed and pushed by the nozzle 42B, and thus, the seventh hole h7 of the second poppet 52D is exposed outside the eighth hole h8. The first poppet 42C is pushed by the first and second protrusion units 52B and 52C, which are first exposure inducing units, and thus, the fifth hole h5 is exposed outside the through hole h66. This position of the first poppet 42C is referred to as a second position of the first poppet 42C. When the seventh hole h7 is exposed outside the eighth hole h8, the second poppet 52D is pushed by the second exposure inducing unit of the first coupling unit 12, for example, the nozzle 42B. The fuel supply path of the second poppet 52D is exposed, and the position of the second poppet 52D is referred to as a fourth position of the second poppet 52D.

In the coupling process described above, the first poppet 42C is moved to the second position from the first position, due to contact with the first exposure inducing units. The second poppet 52D is moved to the fourth position from the third position, due to contact with the second exposure inducing unit.

When the first poppet 42C is moved from the first position to the second position, a gap between the nozzle 42B and the first poppet 42C is increased, and thus, a space IAIC is formed between the nozzle 42B and the first poppet 42C. In this way, the portion of the nozzle 42B that faces the first poppet 42C of the fuel supply path is exposed to the space IAIC. When the first poppet 42C reaches the second position, the coupling of the first through third grooves G11, G12, and G13, with the first and second fixing keys MK1 and MK2 and the auxiliary key SK1, corresponding to the first through third grooves G11, G12, and G13, is completed.

When the first poppet 42C is in the second position, and the second poppet 52D is in the fourth position, the fuel in the cartridge 20 is supplied to the power unit 10, via the seventh hole h7, the sixth hole h6, the nozzle 42B, the space IAIC, the fourth hole h4, and the fifth hole h5, as indicated by the arrow. When the fuel is supplied in this way, the leakage of the fuel filled in the space IAIC can be prevented by the O-ring OR1, which is accommodated in the first groove G1.

The release of the power unit 10 from the cartridge 20 is performed in a reverse process, as illustrated in FIGS. 19 to 16. During the decoupling process, the first poppet 42C moves from the second position to the first position.

Figure 20:
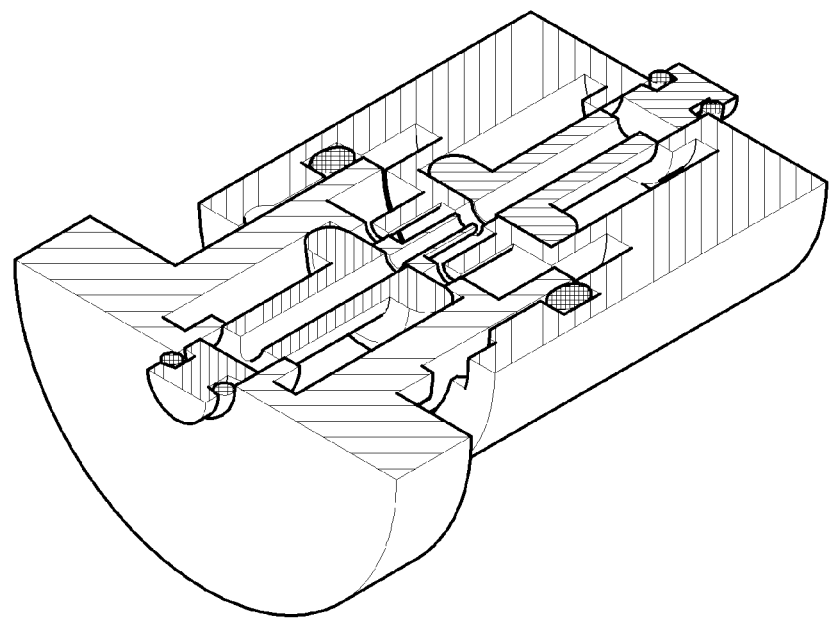
FIG. 20 is a perspective view showing a cross-section of the power unit and the cartridge of FIG. 18, in the method described with reference to FIGS. 16 through 19.

FIG. 20 is a perspective view of the coupling of the first coupling unit 12 and the second coupling unit 22, of FIG. 18. FIG. 21 is a perspective view of the coupling of the first coupling unit 12 and the second coupling unit 22 of FIG. 19.

FIG. 22 is a front view of the first coupling unit 12, in which various positions of the auxiliary key SK1, with respect to the first and second fixing keys MK1 and MK2, are shown. In FIG. 22, the male portion PT2 of the first coupling unit 12 is depicted, and, for convenience of drawing, the nozzle 42B and the first and second holes h1 and h2, are not shown. The embodiments in FIG. 22 show the male portion PT2 including only one auxiliary key SK1. However, the male portion PT2 can include any suitable number of auxiliary keys SK1.

Figure 22A:
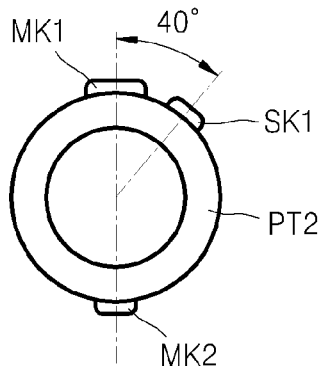
FIGS. 22A-22F are front views of various locations of an auxiliary key included in the power unit side-coupling unit.

In FIG. 22A, the auxiliary key SK1 forms an angle of 40° with respect to the first fixing key MK1. In FIGS. 22B-22F, the auxiliary keys SK1 respectively form angles of 70°, 100°, 230°, 270°, and 300° with respect to the first fixing key MK1. Although not shown, the first and second retention keys P1 and P2 may be positioned in various locations, according to the location of the auxiliary key SK1.

In order for the first coupling unit 12 and the second coupling unit 22 to be correctly coupled, the first and second fixing keys MK1 and MK2, and the auxiliary key SK1 must be correctly matched with the first through third grooves G11, G12, and G13, which are formed in the second coupling unit 22. Therefore, if the first and second fixing keys MK1 and MK2, and the auxiliary key SK1 have the arrangement as depicted in FIG. 22A, in order for the cartridge 20 to accepted by the power unit 10. The third groove G13 is located in a position corresponding to the auxiliary key SK1. That is, in a position rotated 40°, in a counter clockwise direction, from the first groove G11, when the second coupling unit 22 is viewed from the front, with the groove G11 in the top position.

As described above, when the first and second fixing keys MK1 and MK2 are fixed, the kind of the cartridge 20 that can be coupled to the power unit 10 may be determined, according to the position of the auxiliary key SK1. Therefore, specific cartridges may be designated, depending on position of the auxiliary key SK1, and/or depending on the arrangements of the first and second fixing keys MK1 and MK2, and the auxiliary key SK1. Accordingly, the auxiliary key SK1 may be used as a certifying key, to certify that a cartridge is a particular type that can be coupled to the power unit 10.

For example, if the arrangement of the first and second fixing keys MK1 and MK2, and the auxiliary key SK1, is the same as FIG. 22A, the auxiliary key SK1 may be a certifying key that certifies a non-compressive cartridge (hereinafter, a first cartridge) having a fuel concentration of 98.0±1.5 mass %. This denotes that the first cartridge has three grooves that can correctly accommodate the first and second fixing keys MK1 and MK2, and the auxiliary key SK1, arranged in FIG. 22A.

Figure 22B:
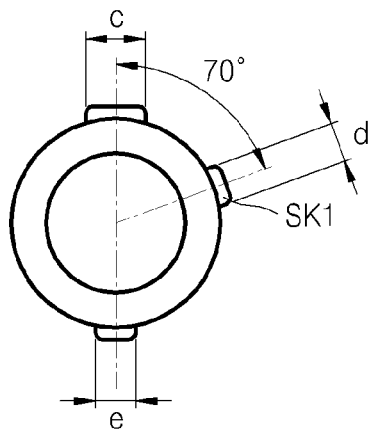
Figure 22C:
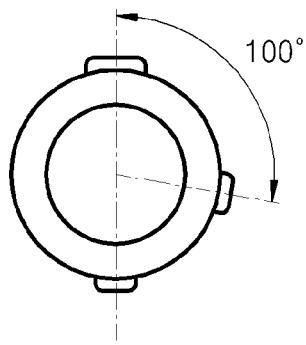
Figure 22D:
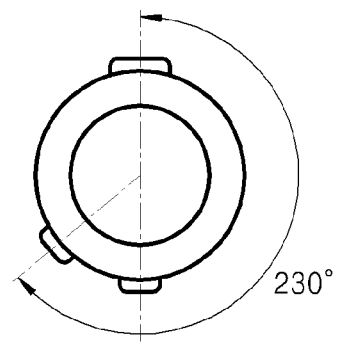
Figure 22E:
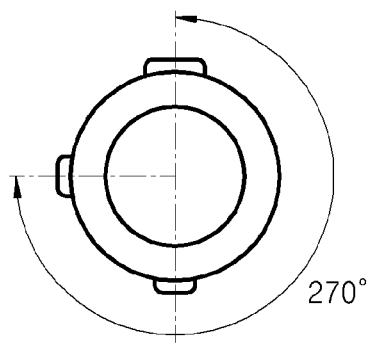
Figure 22F:
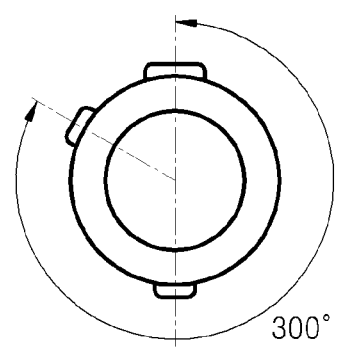

If the same theory is applied to FIG. 22B, the auxiliary key SK1 that makes an angle of 70°, with respect to the first fixing key MK1, may be, for example, a certifying key that certifies a non-compressive type cartridge (hereinafter, a second cartridge) having a fuel concentration of 64.0±1.5 mass %. The auxiliary key SK1 of FIG. 22C may be, for example, a certifying key that certifies a non-compressive type cartridge (hereinafter, a third cartridge) having a fuel concentration of 61.8±1.5 mass %. The auxiliary key SK1 of FIG. 22D may be, for example, a certifying key that certifies a compressive type cartridge (hereinafter, a fourth cartridge) having a fuel concentration of 98.0±1.5 mass %. The auxiliary key SK1 of FIG. 22E may be, for example, a certifying key that certifies a compressive type cartridge (hereinafter, a fifth cartridge) having a fuel concentration of 64.0±1.5 mass %. The auxiliary key SK1 of FIG. 22F may be, for example, a certifying key that certifies a compressive type cartridge (hereinafter, a sixth cartridge) having a fuel concentration of 61.8±1.5 mass %.

Table 1 summarizes the auxiliary keys SK1 and the corresponding cartridges that are certified by the auxiliary keys SK1, at each angle of FIGS. 22A-22F.

TABLE 1

| No. | Rotation angle (clockwise direction) | Corresponding cartridge |
| --- | --- | --- |
| 1 | 40 | First cartridge |
| 2 | 70 | Second cartridge |
| 3 | 100 | Third cartridge |
| 4 | 230 | Fourth cartridge |
| 5 | 270 | Fifth cartridge |
| 6 | 300 | Sixth cartridge |

In FIGS. 22A-22F, the first fixing key MK1 may have a width c of 4.0 mm, or less, for example, 2.2 mm (±0.01 mm). The second fixing key MK2 may have a width e of 2.5 mm or less, for example, 1.4 mm (±0.01 mm). The auxiliary key SK1 may have a width d of 2 mm or less, for example, 1.4 mm (±0.01 mm).

Figure 23:
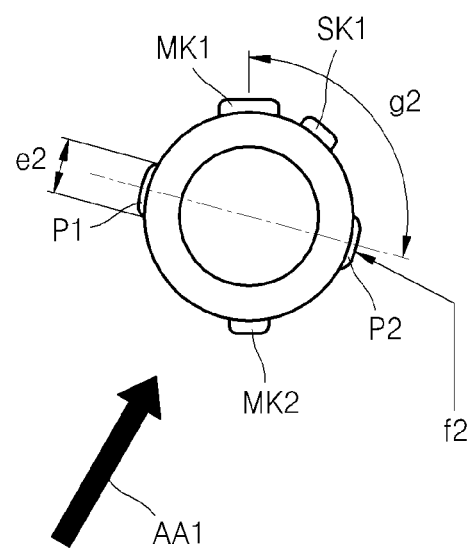
FIG. 23 is a front view showing relative locations of retention keys, with respect to a fixed key and an auxiliary key.
Figure 24:
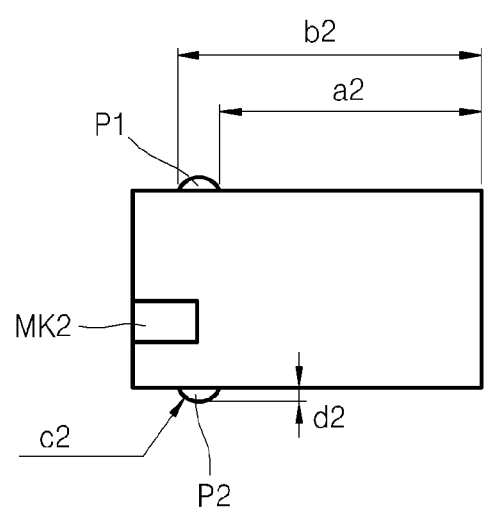
FIG. 24 is a side view seen from a direction indicated by the arrow of FIG. 23.

FIG. 23 is a front view showing the relative locations of the first and second retention keys P1 and P2, with respect to the first and second fixing keys MK1 and MK2, and the auxiliary key SK1. FIG. 24 is a side view of FIG. 23, as seen from a direction indicated by the arrow AA1.

Referring to FIG. 23, the first and second retention keys P1 and P2 may be located at opposite positions, between the first and second fixing keys MK1 and MK2, on the surface of the male portion PT2. The first and second retention keys P1 and P2 may be located on the same line. An angle g2, between a line that passes the first and second retention keys P1 and P2, and the first fixing key MK1, is approximately 150°, when the angle g2 is measured in a clockwise direction. If a length measured along a circumference of the male portion PT2, between the first and second retention keys P1 and P2, is referred to as a width, the width e2 of the first and second retention keys P1 and P2 may be 3 mm, or less, for example, 1.76 mm (±0.01 mm). A diameter of a circle that includes a first circular arc f2, between the first and second retention keys P1 and P2, may be 5 mm, or less, for example, 3.97 mm (±0.01 mm).

Referring to FIG. 24, a short cut a2, from the end of the male portion PT2 to the first retention key P1, or to the second retention key P2, may be 7 mm, or less, for example, 4.35 mm (±0.01 mm). A distance b2 from the end of the male portion PT2 to a lower boundary of the first retention key P1, or to the second retention key P2, may be 8 mm, or less, for example, 5.45 mm (±0.01 mm). The first and second retention keys P1 and P2 may have a thickness d2 of 1 mm, or less, for example, 0.27 mm (±0.01 mm). A diameter of a circle that includes a second circular arc c2, of the first and second retention keys P1 and P2, may be 2 mm, or less, for example, 0.70 mm (±0.01 mm).

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A power unit comprising a coupling unit to couple with a fuel cartridge, the coupling unit comprising:
    a nozzle to receive fuel from the fuel cartridge, the nozzle having an entirely empty interior;
    an outer unit surrounding the nozzle;
    a selection key disposed on the outer surface of the outer unit, to selectively mate with the fuel cartridge,
    an inner portion having an inner space including a poppet that moves into the power unit when the fuel cartridge and the power unit are coupled, wherein the nozzle and the poppet at least partially define a fuel flow channel, and
    a middle plate between the outer unit and the inner space of the coupling unit, the nozzle extending from a center of the middle plate into the outer unit, the middle plate including holes spaced apart from the nozzle, the holes exposing the poppet inside the inner space,
    wherein the position of the nozzle is lower than an end of the outer unit and higher than the selection key, the fuel passes through the nozzle, and the nozzle and the outer unit are one body.

2. The power unit of claim 1, wherein the selection key is positioned so as to mate with the fuel cartridge, before the nozzle receives the fuel, when the power unit is coupled with the fuel cartridge.

3. The power unit of claim 1, wherein the selection key includes first and second fixing keys, which are fixed on the outer unit, and face opposing sides of the nozzle.

4. The power unit of claim 3, wherein the selection key further includes an auxiliary key positioned between the first and second fixing keys.

5. The power unit of claim 1, wherein the coupling unit further includes at least a second auxiliary key.

6. The power unit of claim 1, further comprising a coupler disposed on the outer surface of the outer unit, to attach the fuel cartridge to the power unit.

7. The power unit of claim 1, wherein the nozzle has an inner diameter of 0.8 mm (±0.01 mm).

8. The power unit of claim 1, wherein the selection key is located 4.6 mm (±0.01 mm) from an end of the outer unit.

9. The power unit of claim 1, further comprising an elastic member that biases the poppet towards the nozzle.

10. The power unit of claim 1, further comprising an O-ring to seal an area between the coupling unit and the power unit.

11. A fuel cartridge comprising a coupling unit to couple with a power unit having an outer unit, the coupling unit comprising:
    an outer portion including an inner circumference unit to mate with the outer unit of the power unit,
    an inner space including a poppet having a central flow channel;
    a middle plate between the outer portion and the inner space of the coupling unit, the middle plate including a hole at a center of the middle plate exposing the poppet surrounding the central flow channel, and the middle plate including projections spaced apart from the hole and extending from the middle plate; and
    a groove to accommodate a selection key of the power unit.

12. The fuel cartridge of claim 11, further comprising a seal disposed in the inner circumference unit, to seal the coupling unit to the power unit.

13. The fuel cartridge of claim 12, wherein the seal includes an O-ring disposed in a groove defined in an inner surface of the inner circumference unit.

14. The fuel cartridge of claim 11, further comprising an elastic member that biases the poppet towards the middle plate.

15. A fuel cell system, comprising:
    a power unit including a first coupling unit; and
    a fuel cartridge to supply a fuel to the power unit, the fuel cartridge including a second coupling unit to couple with the first coupling unit, wherein,
    the first coupling unit includes,
        a nozzle that receives the fuel supplied from the fuel cartridge, the nozzle having an entirely empty interior,
        an outer unit that surrounds the nozzle,
        a selection key disposed on the outer surface of the first coupling unit, to selectively mate with the fuel cartridge,
        an inner portion having an inner space including a poppet, that moves away from the nozzle, to open a fuel supply path formed by the nozzle and the poppet, when the fuel cartridge and the power unit are coupled, and
        a middle plate between the outer unit and the inner space of the coupling unit, the nozzle extending from a center of the middle plate into the outer unit, the middle plate including holes spaced apart from the nozzle, the holes exposing the poppet inside the inner space of the first coupling unit, and the second coupling unit includes,
a fuel supply path that supplies the fuel to the nozzle, and
an inner circumference unit to mate with the outer unit, having a groove disposed therein to accommodate the selection key, wherein the fuel passes through the nozzle, and the nozzle and the outer unit are one body.

16. The fuel cell system of claim 15, wherein the selection key is positioned to selectively mate with the fuel cartridge, before the nozzle receives the fuel from the fuel cartridge.

17. The fuel cell system of claim 15, wherein the selection key of the first coupling unit is disposed on the outer surface of the outer unit of the first coupling unit.

18. The fuel cell system of claim 15, wherein the selection key of the first coupling unit comprises:
first and second fixing keys fixed to the outer surface of the outer unit; and
an auxiliary key disposed on the outer surface of the outer unit.

19. The fuel cell system of claim 15, further comprising a coupler disposed on the outer surface of the outer unit, to attach the fuel cartridge to the power unit, by mating with the inner surface of the second coupling unit.

20. The fuel cell system of claim 15, wherein the nozzle of the first coupling unit has an inner diameter of 0.8 mm (+0.01 mm).

21. The fuel cell system of claim 15, wherein the selection key of the first coupling unit is located 4.6 mm (±0.01 mm) from an end of the outer unit.

22. The fuel cell system of claim 15, further comprising an elastic member that biases the poppet towards the nozzle.

23. The fuel cell system of claim 15, further comprising an O-ring to seal an area between the first coupling unit and the power unit.

24. The fuel cell system of claim 15, further comprising a seal to seal an area between the first coupling unit and the second coupling unit, before the nozzle of the first coupling unit contacts the fuel supply path of the second coupling unit.

25. The fuel cell system of claim 24, wherein the seal is an O-ring accommodated in a groove defined in the inner surface of the second coupling unit.

26. A fuel cell system comprising:
a power unit comprising,
a nozzle to receive fuel from a fuel cartridge, the nozzle having an entirely empty interior;
an outer unit surrounding the nozzle;
a selection key disposed on the outer surface of the outer unit, to selectively mate with the fuel cartridge,
an inner portion having an inner space including a poppet that moves into the power unit when the fuel cartridge and the power unit are coupled by a coupling unit, wherein the nozzle and the poppet at least partially define a fuel flow channel, and
a middle plate between the outer unit and the inner space of the coupling unit, the nozzle extending from a center of the middle plate into the outer unit, the middle plate including holes spaced apart from the nozzle, the holes exposing the poppet inside the inner space,
wherein a position of the nozzle is lower than an end of the outer unit and higher than the selection key, the fuel passes through the nozzle, and the nozzle and the outer unit are one body, and a fuel cartridge to couple with the power unit to supply the fuel to the power unit, the fuel cartridge including,
a fuel supply path to supply the fuel to the nozzle; and
a first exposure inducing unit to move the poppet to open the fuel supply path, when the power unit and the fuel cartridge are coupled.

27. The fuel cell system of claim 26, wherein:
the poppet is a first poppet;
the fuel cartridge further includes a second poppet to open and close the fuel supply path, and
the power unit includes a second exposure inducing unit to move the second poppet to open the fuel supply path, when the fuel cartridge and the power unit are coupled.

28. The fuel cell system of claim 26, wherein the selection key of the coupling unit is disposed on the outer unit of the coupling unit, such that the selection key mates with the fuel cartridge, before the nozzle receives the fuel from the fuel cartridge, when the fuel cartridge is coupled with the power unit.

29. The fuel cell system of claim 26, wherein the selection key comprises first and second fixing keys, which are fixed on a male portion, and face opposing sides of the nozzle.

30. The fuel cell system of claim 29, wherein the selection key further includes an auxiliary key moveably disposed on the male portion.

31. The fuel cell system of claim 26, wherein the nozzle of the coupling unit has an inner diameter of 0.8 mm (±0.01 mm).

32. The fuel cell system of claim 26, wherein the selection key is disposed 4.6 mm (±0.01 mm) from an end of a male portion.

33. The fuel cell system of claim 26, wherein the first poppet is moved away from the nozzle to expose an opening of the first poppet, and thereby open the fuel supply path, when the fuel cartridge and the power unit are coupled.

34. The fuel cell system of claim 26, wherein:
the coupling unit is a first coupling unit,
the fuel cartridge includes a second coupling unit to couple with the first coupling unit, and
the second coupling unit includes a female portion into which the outer unit of the first coupling unit is inserted, the second coupling unit having a groove to accommodate the selection key of the first coupling unit.

35. The power unit of claim 1, wherein the outer unit is a male portion to mate with a female portion of the cartridge.

36. The fuel cartridge of claim 11, wherein the inner circumference unit is a female portion of the fuel cartridge, the outer unit is a male portion of the power unit, and the male portion mates with the female portion.

37. The fuel cell system of claim 15, wherein the outer unit is a male portion of the first coupling unit, the inner circumference unit is a female portion of the second coupling unit, and the male portion mates with the female portion.

* * * * *